Nov. 29, 1966 — A. C. MAMO — 3,287,908
HYDROKINETIC TORQUE CONVERTER
Filed Jan. 3, 1964 — 6 Sheets-Sheet 1

Inventor:
Anthony C. Mamo
By: Joseph W. Malleck, Atty.

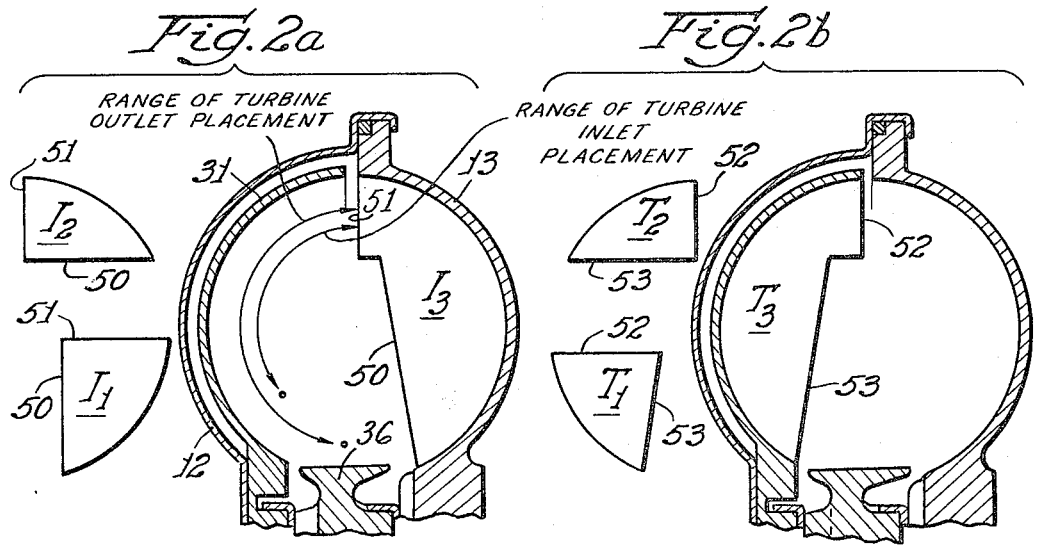
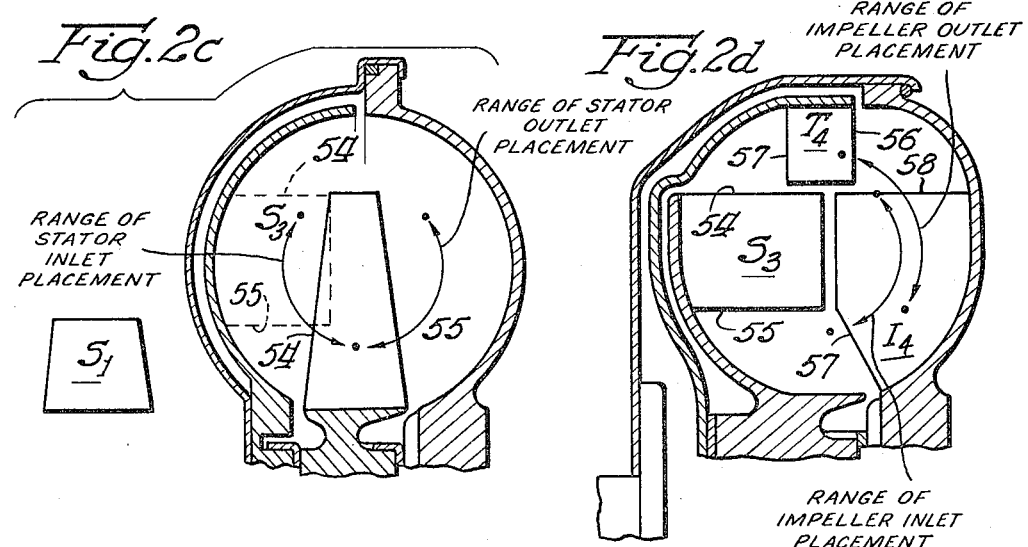
GUIDE VANE PLACEMENT PARAMETERS PER LOCATION OF AVERAGE FLOW POINT.
|  |  | INLET | | OUTLET | |
|---|---|---|---|---|---|
|  |  | MIN. | MAX. | MIN. | MAX. |
| IMPELLER | DIA. | 2.904 | 5.478 | 4.224 | 6.336 |
|  | % | 44 | 83 | 64 | 96 |
| TURBINE | DIA. | 4.224 | 6.336 | 6.336 | 2.904 |
|  | % | 64 | 96 | 96 | 44 |
| STATOR | DIA. | 2.904 | 5.478 | 2.904 | 5.478 |
|  | % | 44 | 83 | 44 | 83 |
Fig. 3
Inventor:
Anthony C. Mamo
By: Joseph W. Malleck Atty.

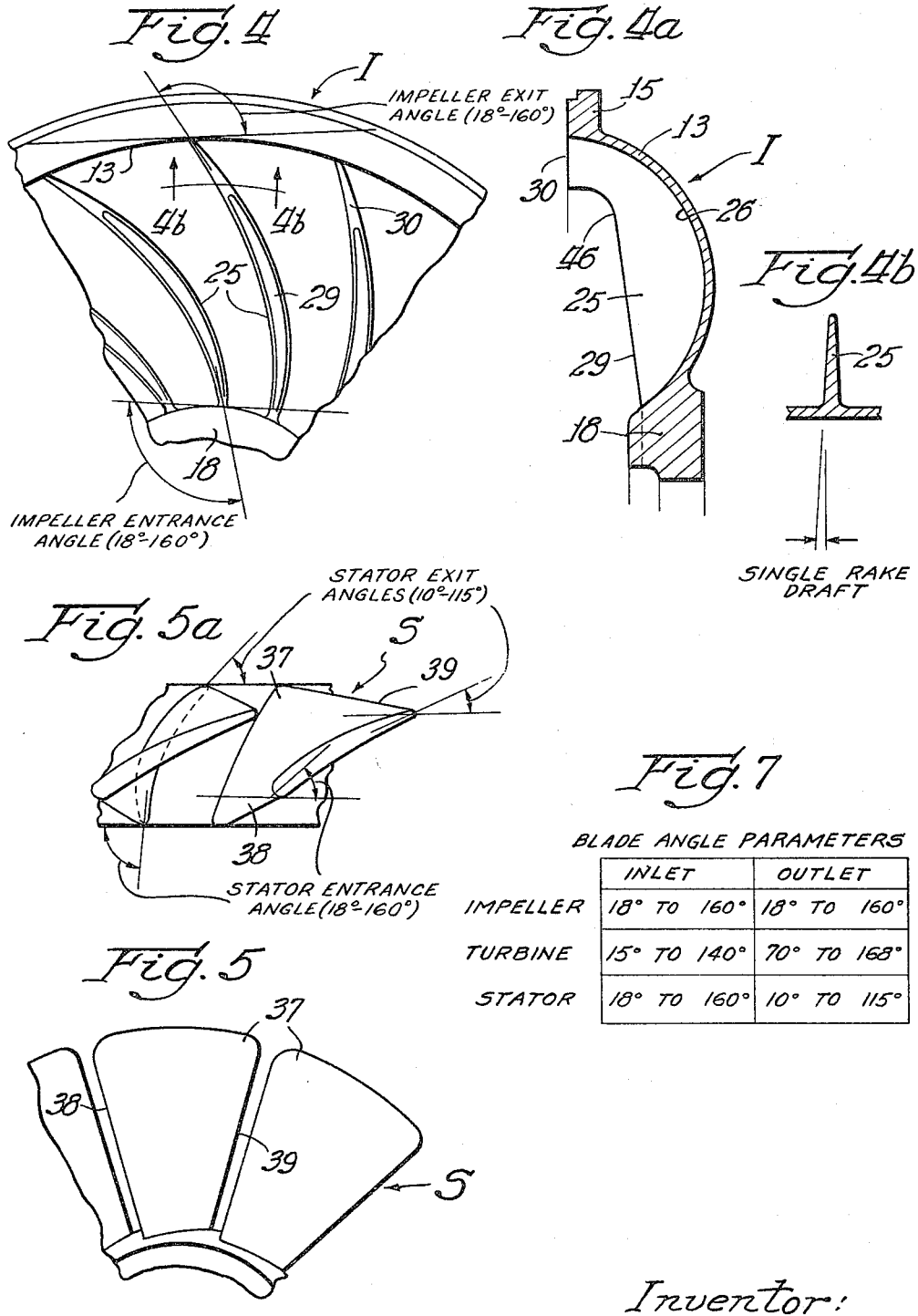

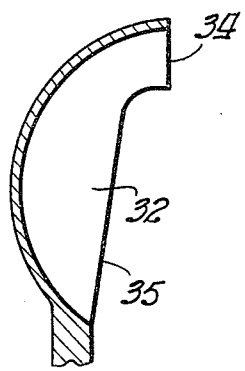
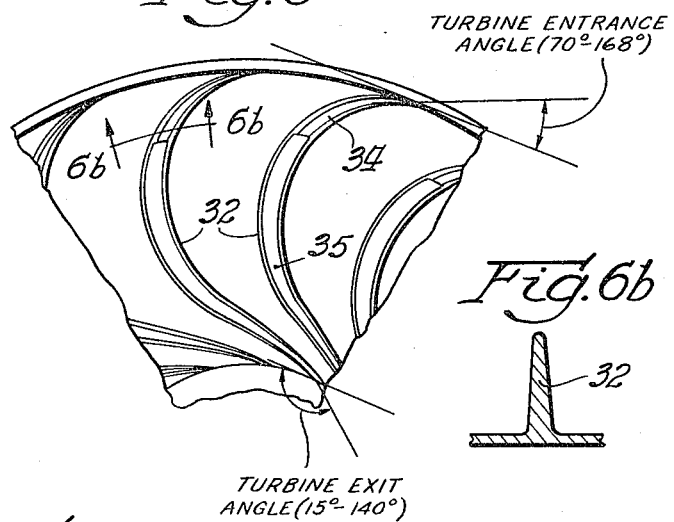
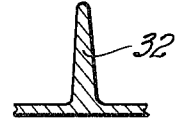
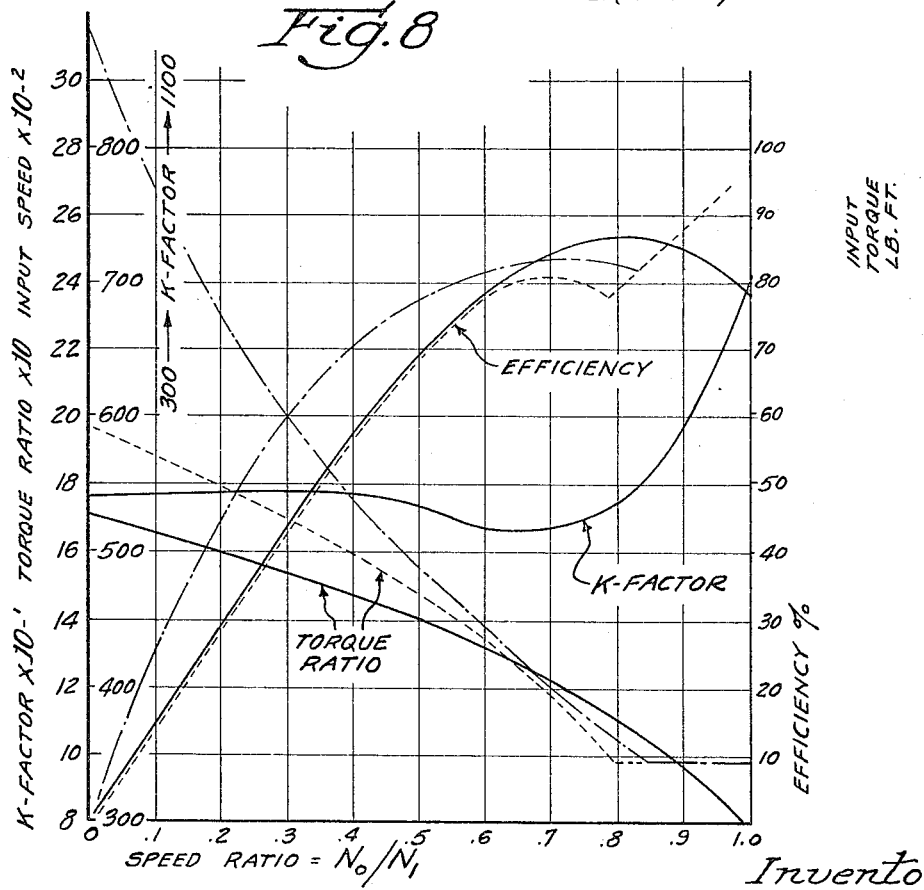

Inventor:
Anthony C. Mamo
By: Joseph W. Malleck, Atty.

Inventor:
Anthony C. Mamo
By: Joseph W. Malleck, Atty.

United States Patent Office 3,287,908
Patented Nov. 29, 1966

3,287,908
HYDROKINETIC TORQUE CONVERTER
Anthony C. Mamo, Des Plaines, Ill., assignor to Borg-Warner Corporation, Chicago, Ill., a corporation of Illinois
Filed Jan. 3, 1964, Ser. No. 335,564
4 Claims. (Cl. 60—54)

This invention relates, in general, to torque transmitting devices and more particularly to hydraulic torque converters adapted to multiply and transmit torque to a load from an engine as now employed on vehicles, and which is characterized by being wholly or substantially devoid of core members.

The torque converter art today has reached a highly refined stage with many alternatives open to a design engineer for meeting certain requirements of a power transmission problem. However, none of the alternatives are universally superior in all characteristics of performance; therefore emphasis of one performance characteristic by special design usually necessitates sacrifice of certain performance in other characteristics. Thus, flexibility in varying the torque converter blading configuration in thickness, contour leading and trailing edge placement, and edge angles as well as the size and arrangement of bladed elements, must be available to the engineer to meet the need of the application.

How, then, can further advances in economy of manufacture be obtained while retaining such versatility of design? If the use of the torque converter is to be expanded to areas such as golf carts, garden tractors, washing machine drive systems and others, lower cost of manufacture must be considered as a primary factor.

Solution to the above problem by this invention resides in the complete elimination or substantial reduction of core members from conventional torque converter design and in place thereof a refinement of torque converter vaning or blading to assume full guidance of the fluid while at the same time compensating for fluid forces in order to achieve coherent circulation of a fluid body (which in the preferred embodiment occupies essentially the entire enclosed converter chamber). The fluid body is defined by structure which opens up low cost techniques of fabrication with enhanced performance in certain characteristics. The elimination or reduction of core members would itself provide great strides in reducing the costs of converter manufacture. For example, the bladed elements of the converter could then be produced with a minimum number of assembly and machine operations through conventional casting techniques. However, this invention further contemplates provision of converter elements with two-dimensional blades (instead of the three-dimensional blading which has been almost exclusively used heretofore). This combination of effects reduces the casting technique to the use of only two pattern elements for any bladed element (compared to the normal use of a minimum pattern piece for any of the elements). Materials such as plastics, zinc and aluminum may be now used much more competitively under this combination effect.

Accordingly, it is a primary object of this invention to provide an improved hydraulic torque converter, particularly characterized by the complete or substantial elimination of core members formerly utilized in stimulating and entraining circulation flow about the conventional toroidal fluid path of a converter. Particular structural features of this object comprise the provision of fluid guide means which are adapted to guide the circulation of fluid flow around the torus centerline (the torus centerline is used herein as the circular path generated by the center point of a section which is revolved to form the toroidal shape) while allowing the fluid particles three-dimensional freedom to adjust to forces throughout the full interior of the converter shell; the blades are supported solely by the semi-toroidal shell of the particular converter element and at least one element is adapted to have the vanes extend into the normally void core area. The blades of at least one element may extend across the centerline of the torus, or at least one element may be provided with blades having either the leading or trailing edge disposed chordally of a circle inscribing the circulation flow.

Another object of this invention is to provide a hydraulic torque converter which is considerably cheaper to fabricate than devices of the prior art. Pursuant to this object, the invention contemplates construction of the converter with two-dimensional blading, having a single rake draft, enabling the bladed elements to be produced with unprecedented economy of manufacture in both tooling and production rate; single rake draft dies have a very long life and require only one man to operate them. The elimination of the core ring and the use of two-dimensional blading permits the use of very low cost manufacturing techniques as well as the use of materials such as plastics, zinc and aluminum for additional reductions.

Another object of this invention is to provide a hydrodynamic coupling device devoid of core elements which is adapted to have a variable hydraulic center of circulation as well as utilizing the full interior space of the shell for fluid working purposes. This may be analogized to employing another small torque converter within the normally viod core area of prior art devices; this affords a substantial dividend in operating characteristics such as torque capacity and coupling efficiency.

Still another object of this invention is to provide a hydraulic torque converter of the coreless type having optimum performance characteristics. A particular structural feature pursuant to this object is the definition of blades having the leading and trailing edges geometrically disposed so that fluid flow thereacross may be substantially radial with respect to the torus centerline and thereby give greater guidance to the fluid flow; the blades are provided so that the leading and trailing edge angles are prescribed within limits to optimize desirable performance characteristics.

Still another object of this invention is to provide a hydraulic torque converter of the coreless type which has means adapted to improve the matching capabilities of a particular engine to the converter. The invention herein permits greater freedom in varying the slope of the "K" curve, the latter being most important in matching for good performance.

Modifications of the principal embodiment of the invention which are disclosed herein show that the blades can be disposed at different angles so that the fluid flowing thereacross can be controlled in order to meet different operating requirements. Other modifications show that the principles of this invention are applicable to other types of torque converters; for example, stamped blading can be utilized. Although this invention comprises the teaching of many structural features to provide for a coreless converter, any number of the features may be used; all features combined will give maximum cost reduction.

The foregoing and numerous other objects and advantages of the present invention will become apparent from the following detailed description when read in conjunction with the accompanying drawings, wherein:

FIG. 2a is a composite fragmentary view like that in FIG. 1, illustrating the maximum and minimum configuration of the impeller blades;

FIG. 2b is a composite view like that in FIG. 2a, depicting the turbine blades;

FIG. 2c is a composite view like that in FIG. 2a, depicting the stator blades;

FIG. 2d is a view like that in FIG. 1, illustrating a non-symmetrical flow arrangement combining the blades within the ranges depicted by FIGS. 2a to 2c;

FIG. 3 is a chart of blade placement parameters for the elements of the converter;

FIG. 4 is a fragmentary plan view of a typical impeller;

FIG. 4a is a torus profile view of a typical blade of the impeller of FIG. 4;

FIG. 4b is an enlarged sectional view taken substantially along line 4b—4b of FIG. 4;

FIG. 5 is a fragmentary profile view of a typical stator;

FIG. 5a is a fragmentary view similar to the plan views of FIG. 4 for the stator of FIG. 5;

FIG. 6 is a fragmentary view of a typical turbine;

FIG. 6a is a fragmentary profile view of a blade of the turbine of FIG. 6;

FIG. 6b is an enlarged sectional view taken substantially along line 6b—6b of FIG. 6.

FIG. 7 is a chart of blade angle parameters;

FIG. 8 is a graphical illustration of the operating characteristics of the embodiment of FIG. 1;

Figure 1:
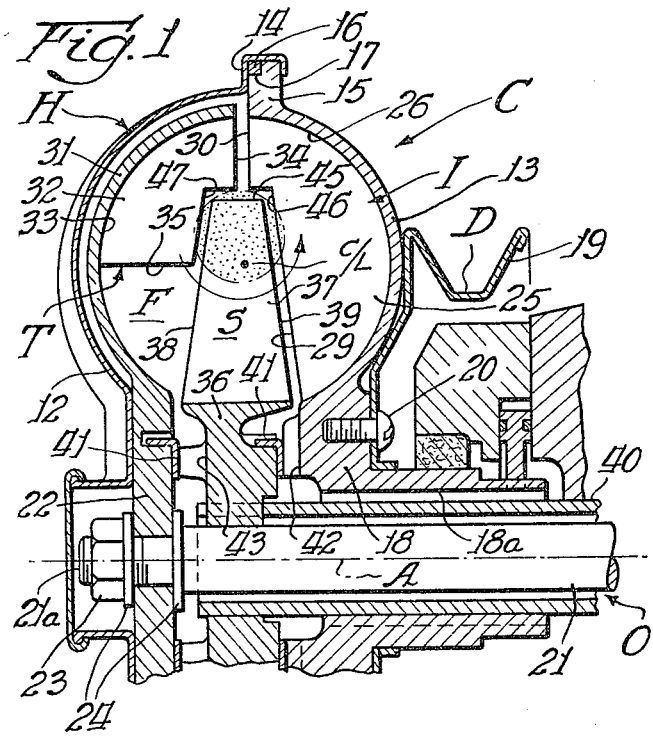
FIG. 1 is a central sectional view taken through the upper half of one preferred form of hydraulic torque converter constructed in accordance with the principles of the present invention.

With reference now to the drawings wherein like reference numerals have been utilized in the different views to identify identical parts, and wherein different letters have been added to the reference numerals to identify corresponding parts in modified forms of the invention, one preferred embodiment of the present invention, as disclosed in FIG. 1, will first be described. The hydraulic torque converter C disclosed therein comprises, in general, a housing H, an impeller I, a turbine T, a stator S, and has drive or input means D as well as output means O. The impeller and turbine are each rotatable about a common axis A and together define a toroidal fluid chamber F having a geometric torus centerline C/L. The impeller is adapted to function to impart energy to the body of fluid in the torque converter, the turbine receiving energy from the fluid, and the stator being held from rotation and thereby functioning as a reaction member to change the direction of flow of the liquid so that the converter may multiply torque. After a predetermined speed of rotation of the turbine is reached, the stator undergoes a change of tendency to rotate in a reverse direction to one of a tendency to rotate in a forward direction; the stator, by virtue of its mounting may be held stationary, or may be permitted to rotate in said forward direction and thereby permit the converter to function as a simple two element fluid coupling.

In more particularity, the housing H comprises a first semi-toroidal portion 12 and a second semi-toroidal portion 13, the latter being adapted to serve as the outer shell of the impeller. Each of the portions 12 and 13 has annular flanges 14 and 15 respectively, adapted to interfit with one another and arranged for being fastened together; seal means 16 is provided in a suitable annular groove 17 to form a fluid tight connection between the portions. The housing H is drivingly connected to the input means by a hub 18 on the second semi-toroidal portion 13 coupled to a belt wheel 19 by suitable fastenings 20; power may be supplied to the wheel by conventional belts (not shown).

The output means O comprises a driven shaft 21 extending through a central opening 18a of the hub 18 of the second toroidal portion 13. The driven shaft may be connected to any suitable load and has suitable bearings for support during operation. One end 21a of the driven shaft is drivingly connected to the turbine hub 22; the inner periphery of the hub snugly fits about a reduced threaded portion of the shaft end 21a and a threaded fastener such as nut 23 is used to lock the hub between suitable washers 24 and provide a tight connection.

Turning now to the elements of the converter, the impeller, as indicated heretofore, is formed partly by the second semi-toroidal portion 13 constituting the outer shell of the impeller. A plurality of blades 25 are formed to the interior surface 26 of the semi-toroidal portion 13; the blades have a predetermined curvature and are adapted to impart kinetic energy to the fluid within the torque converter chamber F. The impeller blades have a leading edge 29 and a trailing edge 30 which will be described in more detail hereinafter.

The turbine T is formed with a semi-toroidal outer shell 31 adapted to conform generally in spaced relation to the inner surface of the first semi-toroidal portion 12; the turbine similarly has blades 32 formed on the inner surface 33 of the shell 31 and extend radially inwardly with respect to the torus centerline C/L, leading and trailing edges of the blades 32 are designated respectively as 34 and 35.

The stator S may be rigidly or rotatably supported on a hub 36 having blades 37 extending radially inwardly with respect to the torus centerline of each of the vanes having leading and trailing edges 38 and 39 respectively. The hub 36 is connected to a sleeve shaft 40 which in turn is adapted to be held from rotation in one direction and thereby prevent rotation of the stator for torque multiplying purposes.

The hub 36 is aligned by bearing rings 41 disposed between the hub and the adjacent turbine and impeller hubs. Opening 42 is provided in the impeller hub 18 to communicate a converter charging pressure source (not shown) with the leading edge 29 of the impeller guide vanes. An opening 43 is provided in the stator hub to return converter fluid back to sump (not shown).

In this converter the invention in part contemplates definition of the circulating fluid body without the usual use of core members, which have heretofore been used to stimulate as well as entrain or guide the vortex flow which takes place about the torus centerline in a direction substantially similar to the arrow shown in FIG. 1. Pursuant to this goal, the impeller, turbine and stator are arranged with the most inwardly disposed edges or peripheries (as viewed in the torus profile of FIG. 1) so that the normally void core area may be substantially occupied by positive fluid guide means such as the blades 37 of the stator. The occupancy of the conventionally void core area by blades or other element blades permits the use of greater torque transmitting capabilities within the same peripheral silhouette as the prior art. As shown in the preferred embodiment, the stator is arranged so that the leading and trailing edges define a symmetrical arrangement with respect to a plane perpendicular to the axis A and passing through the C/L; neither of the leading or trailing edges pass through the centerline. The blades are squared off at the tips with an edge 45 offset substantially to one side of the centerline. The impeller and turbine are provided with blades having their innermost edges 46 and 47 respectively arranged so that they are closely contiguous to the adjacent edges 45, 38 and 39 of the stator.

Figure 1C:
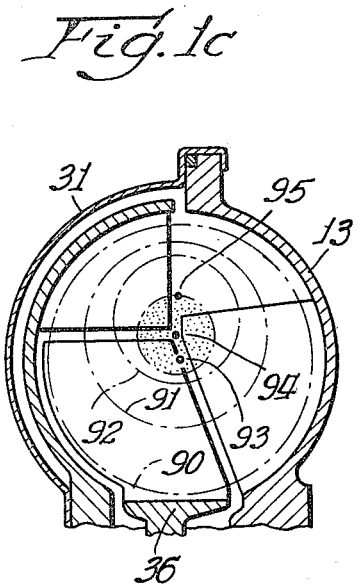
FIGS. 1a to 1c are each fragmentary torus sectional views of the preferred embodiment illustrating alternative arrangements of the fluid blades.

The shaded area shown in FIGS. 1 to 1c depicts the range of positions that the hydraulic center (being used here to mean the vortex eye or axis about which hydraulic fluid circulates in a spiral path along the torus path, as induced by the converter elements) may occupy during the various operating conditions of the torque converter. The lack of core elements provides a novel "intercommunicating" type of fluid guidance which permits the hydraulic center to *shift* or assume its own natural position of least resistance and minimal disturbance to the streamlines of the circulating fluid body.

One effect of the hydraulic eye shift is depicted in FIG. 1c wherein, at low speeds, the principal median streamline of the fluid will be substantially close to the inner surface of the torque converter shells 13, 31 and 36 and will follow path 90. As speeds increase, such streamline will tend to short-circuit due to the greater influence of centrifugal force and also an increase in spinning inertia (see path 91); at high speeds, such as during the coupling range, the path 92 or vortex circle will be as shown in FIG. 1c. At all these speeds the interior volume of the torque converter will be filled with fluid, but the principal flow characteristic will be along such paths. For each shift in vortex circulation the hydraulic eye will move from a low speed position 93 through a median speed position 94, and ultimately to a high speed position 95. Thus the fluid can follow its own nautral streamline under such shifts to achieve excellent flow characteristics, reducing internal fluid shear or friction.

To take advantage of this natural change in vortex circulation, the torque converter element, which is disposed principally in the inner radial region of the fluid toroid such as the stator of the preferred embodiment, is structurally defined to have a radial variation in the leading and trailing edge angles, which corresponds to the radial shift of the principal streamline. Such radial variation can be a twist in the blade profile, as illustrated in FIG. 5a; the twist, in effect, permits the principal flow at any given speed to enter and leave the stator vanes 37 parallel to the mean camberline of the blade or vane foil.

It is well known that, to achieve higher efficiency in any specific speed range, the fluid vanes or blades must have entrance angles which are in line with the directional vector of the fluid flow. These directional vectors change in response to increases of the speed of the fluid as imparted by the impeller, and result in both a radial vector change due principally to centrifugal force, and a rotational change due principally to an increase in spinning. However, since the principal flow will shift from a streamline which hugs the interior shell surfaces to one which is substantially close to the vortex eye, the fixed stator blades can have a twist so that the principal fluid flow will traverse the proper leading edge angle in accordance with speed. In other words, taking a section at any position through a stator blade of FIG. 5a, it will be found that the principal fluid flow will always enter across such section substantially in line with the mean camberline of the blade foil section.

If such twist or scroll is impressed on the turbine or impeller of the torque converter, the efficiency characteristic will highly enhance throughout a broad range of the operation in excess of that known in the art. However, providing such twist or scroll on the stator alone shows increased efficiency in specific speed ranges over that now known.

Figure 1A:
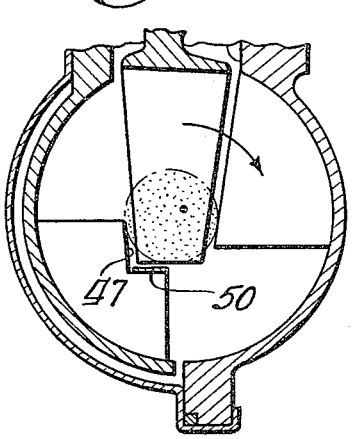

FIG. 1a illustrates another coreless hydrokinetic device similar to FIG. 1, except that the impeller blade occupy a lesser extent of the torus profile, the stator is slightly unsymmetrical, and a local baffle ring 50 is employed to provide a partial inner guidance function aiding in stimulating spiral vortex circulation. The baffle ring 50 is secured across the inner edges 47 of the turbine and is positioned essentially outside the shaded area of hydraulic center adjustment so as not to interfere with the shifting of the latter; the cross-sectional area of the baffle ring 50 is of a small nature so that its presence affects the streamlines but not appreciably the freedom of the hydraulic center to adjust.

Figure 1B:
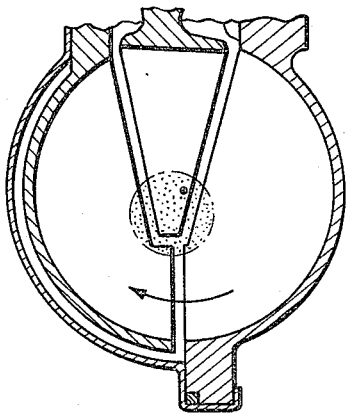

FIG. 1b represents another coreless converter utilizing the invention herein, having the blades of all the elements arranged to occupy substantially all of the torus profile area, which is unprecedented in the art.

The complete occupation of the internal space defined by the converter sleeves in effect provides two torque converters for doing the work. In addition to the normal torque converter fluid toroid the normally void core area is now occupied by vanes, which in a sense is the same as putting a small torque converter within the same void core area space. Immediately it can be seen that all the operating characteritsics of the converter will be increased, which principally includes capacity torque ratio and efficiency.

FIG. 1c illustrates still another coreless torque converter similar to that in FIG. 1a, but employing a highly unsymmetrical stator.

*Edge geometry*

To promote the greatest utilization of energy imparted by arrangement of the elements as above described, it has been found necessary to locate the leading and trailing edges of the elements of the converter in a manner so that the greatest amount of fluid guidance can be imparted to the fluid. To this end, the invention contemplates locating the leading and trailing edges of the blades of the elements as summarized by the chart shown in FIG. 3. Within the limits set out in the chart, the edges are arranged to impart guidance to the fluid, which enables the device to function as a torque multiplier. In conventional hydrokinetic devices utilizing core elements, there is no problem insuring that the circulating fluid body will "feel" the curvature of the guide vanes, since the flow is coerced to flow across all the guide vanes, as directed by the core elements. In the coreless concept herein no such inner wall is available to force the circulating flow to the most inner radial extent of the torus chamber (centrifugal forces will tend to urge the fluid to short-circuit the normal spiral flow forced by prior art core elements). Thus, the leading and trailing edge placement becomes critical if the device is to function as a torque multiplier. It has been found that, if the blades are placed so that at least an important segment thereof is disposed in the radial flow of the circulating fluid body, sufficient "feel" will be provided to function properly.

As shown in FIG. 2a, the outer shells 13, 31 and 36 of each of the respective elements I, T and S of the torque converter of FIG. 1b are shown and the profile of a typical blade $I_3$ for the impeller is included. Adjacent to the sectional view of the embodiment is illustrated the complete profile of an impeller blade $I_1$, which would correspond to the minimum diametrical placement of the leading and trailing edges 50 and 51 corresponding to the limits defined in the chart of FIG. 3, and another profile $I_2$ illustrating the maximum diametrical placement of the leading and trailing edges of the blades according to the chart of FIG. 3. The profile of the blade $I_3$ included within the sectional view of FIG. 2a illustrates the combination of the minimum leading edge placement and the maximum trailing edge placement. These configurations are provided to more clearly illustrate the practical meaning of the chart of FIG. 3. Similarly, in the composite illustration of FIG. 2b, the turbine blade profile is illustrated wherein $T_1$ represents the combination of minimum placement of leading and trailing edges 52 and 53; $T_2$ represents the maximum diametrical placement of leading and trailing edges; and $T_3$ (within the sectional view of FIG. 2b) illustrates the combination of minimum leading edge placement and maximum trailing edge placement.

In FIG. 2c the blade profile for the stator is represented wherein $S_1$ illustrates the construction utilizing the minimum leading edge 54 diametrical placement and the minimum trailing edge 55 diametrical placement. $S_2$ represents a symmetrical stator wherein the maximum leading and trailing edge diametrical placements are shown. $S_3$ is provided to show a non-symmetrical stator configuration wherein the leading edge is positioned at the maximum diametrical limits, as provided by the chart of FIG- 3, and the trailing or outlet edge is placed in some intermediate position within the ranges of the chart.

FIG. 2d illustrates how the placement parameters for each of the elements may be combined in an infinite variety combination. FIG. 2d represents the example where the turbine $T_4$ has leading and trailing edges 56 and 57 adapted to feel the axial flow of the circulating fluid body, while the stator $S_3$ is placed somewhat similar to the Stator $S_3$ of FIG. 2c, so that the radial flow will be felt by the blades therein. The impeller $I_4$ of the configuration of 2d has a trailing edge 58 which is placed in a substantial radial flow of the fluid circulating body while the leading edge 57 has a placement parameter somewhat close to the minimum diametrical position of the chart of FIG. 3. The torus profile is flattened in FIG. 2d to enhance the ability of the fluid to have a more radial flow when traversing the impeller and stator blades.

The chart of FIG. 3 utilizes the average or mean streamline (flow point when shown in profile) which crosses the leading or trailing edge as a criteria in positioning such edges with reference to the overall diameter of the circulating fluid body as defined by the interior walls of the converter. Since the embodiments of this invention were adapted to a converter having a circulating fluid body 6.6″ in diameter, the mathematical values listed according to "DIA" (representing diameter) in the chart of FIG. 3 represent a proportion of such 6.6″ diameter (% symbol used in the chart of FIGURE 8 represents percentage of such overall diameter). Obviously the precise location can be obtained by taking half the diametrical value and positioning them from the axis of rotation to locate the precise flow point with respect to the plane of rotation.

It is essential that, if high efficiency and high torque ratios as well as other desirable operating characteristics of the torque converter are to be obtained, the blade leading and trailing edges must be placed within the ranges, as delineated in FIG. 3. With the freedom of the circulating fluid body to adjust or shift its hydraulic center or eye according to its own natural means, it is important that, if the blades are to impart a guiding function to the fluid, they must be placed so that the angle at the trailing or leading edges which impart a change of direction to the fluid will be felt only if the flow thereacross is in a designated direction and substantially across the edge rather than substantially parallel to it. In prior art devices, the flow has been turned both by the curvatures of the *inner* and outer shells as well as the centrifugal forces to have a substantial axial component when passing across the leading and trailing edges of the impeller and turbine as well as the stator edges. This is permissible with prior art constructions because the flow is forced across these edges irrespective of the factors which normally would tend to permit the flow to adjust to a different path.

To enable the instant invention to eliminate the core elements which have heretofore been relied upon to give fluid guidance, the forces acting on the fluid body had to be determined and programmed over the full range of expected operation. From this it was found that only certain blade angles would suffice. Typical blade angle configurations for the elements of the coreless converter concept are illustrated in FIGS. 4 to 6b. It has been found that the necessary blade angle arrangements lie within the parameters, as set forth in the chart of FIG. 7, to obtain proper operating characteristics over a range of applications. The blade angles at the inlet or outlet edges of the guide vanes are determined in accordance with the system B, outlined on page 959 of the 1962 SAE handbook, wherein all angles are measured from the plane of rotation of the converter to the tangent to the mean camberline of the blades; all angles are positive and zero blade angle is taken to have the maximum possible forward bend angle in the impeller.

The blade angle itself cannot be pictorially represented within the plane of the drawings, but must be related to the specific method of calculation, as outlined in the SAE handbook. However, FIG. 4 illustrates the two-dimensional type of curvature that can be employed with such blades while at the same time permitting the blades to be formed by a die-cast method, resulting in a high level economy of manufacture.

FIGS. 4, 4a and 4b are provided to illustrate the blade angle characteristics of a typical impeller employed in the coreless converter device herein. In FIG. 4 the blades show very apparently that they have sides characterized by single rake draft (single rake draft meaning that looking edgewise at the vanes all of the side surfaces of the vanes will be exposed with no undercuts hidden from view). Thus, accordion-type dies may be employed to form the blades on the shell of the impeller; the dies may be merely pressed together without special handling.

Each of the impeller blades has a gentle curvature in a direction lying within the plane of the drawing sheet (FIG. 4), which is most analogous to the curvature of a banana. The leading edge 29 and the trailing edge 30 of the blades 25 are gradually merged one into the other as shown in profile in FIG. 4a, as made possible by the maximum radial position for the trailing edge, and a general minimum radial position for the leading edge.

In FIGS. 5 and 5a different views of the guide vanes for a typical stator are illustrated. Looking at the profile in FIG. 5, the stator blades 37 have leading and trailing edges 38 and 39 respectively which are each disposed on a radius about the axis of rotation A and are not parallel to each other. The blades 37 have a single rake draft angle taken with respect to one half of the stator (each half being defined by a plane drawn perpendicular to the axis A through the stator); this is permissible, since the accordion dies may be applied from the opposite sides of the stator and therefore the requirement of a single rake draft needs to be met only with respect to one half of the configuration.

In FIGS. 6, 6a and 6b a typical turbine is illustrated with blades 32 having a leading edge 34 and a trailing edge 35, the leading and trailing edges each generally merging one into the other because of the maximum radial positioning of the leading edge, and the minimum radial positioning of the trailing edge. The blades 32 again have single rake draft throughout their lateral extent, as illustrated in FIG. 6b, and have a curvature within the plane of the drawing (FIG. 6) which is generally cup-shaped and most closely analogous to the curvature of a fishtail wherein a portion is return-bent.

Turning now to the performance curve plotted in FIG. 8, such curves were obtained from a converter placed under constant input torque conditions, for example, the 6.6″ converter, being a relatively small type, the input torque was maintained at approximately 16 ft. lbs. As a discussion of the curves will reveal, they clearly indicate the ability of the coreless converter to approximate or better the various characteristics of a conventional torque converter of similar dimensions in coupling range.

The efficiency and torque ratio curves each include a broken line (of short breaks) curve which represents a torque converter utilizing a one-way clutch in conjunction with a stator and being without core elements as in FIG. 1. The full line curves represent a torque converter having a fixed stator and having no core elements according to FIG. 1. The curves of longer breaks represent a torque converter with a fixed stator and are according to FIG. 2d.

The torque ratio curves indicate it is possible to obtain an adequate stall torque ratio without core elements; the torque ratios at the higher speed ratios are not excessively sacrificed for the higher torque ratios at lower speed ratios, as typical of the prior art. The "K" factor curve (which designates the value of the input speed divided by the square root of the input torque) is significant in that it illustrates approximately a flat type "K" curve with a dip near peak efficiency, and then rises to a complete 1 to 1 coupling. The efficiency curves indicate substantial enhanced efficiency over a broader speed range than achieved by comparative prior art devices.

If three-dimensional blading is desired for additional increase in efficiency, it is still possible to obtain such in combination with the economical two-dimensional fabrication of this invention. The tips of blades, after casting, are given a hot striking treatment to form thickened portions. This combination process is still considerably cheaper than known methods.

Two-dimensional blade fabrication

Up until the advent of the instant invention, the fabrication of torque converters has always been a complex and involved sequence of steps. With the complex procedure, manufacturing costs were maintained at comparatively high levels. This is quite understandable when it is considered that the use of an inner core ring, in conjunction with the outer shell of each element dictated that simple casting techniques could not be used. A multiple number of pattern pieces were necessary to form the multitude of blades disposed interior of the core ring itself. The use of complex blade angles of compound curvature was largely responsible for the need of a large number of pattern pieces to accommodate such configurations. The blades were curved not only with respect to the plane of rotation, but also had curvature, commonly called "scroll" within the perpendicular plane or rotation.

Figure 9:
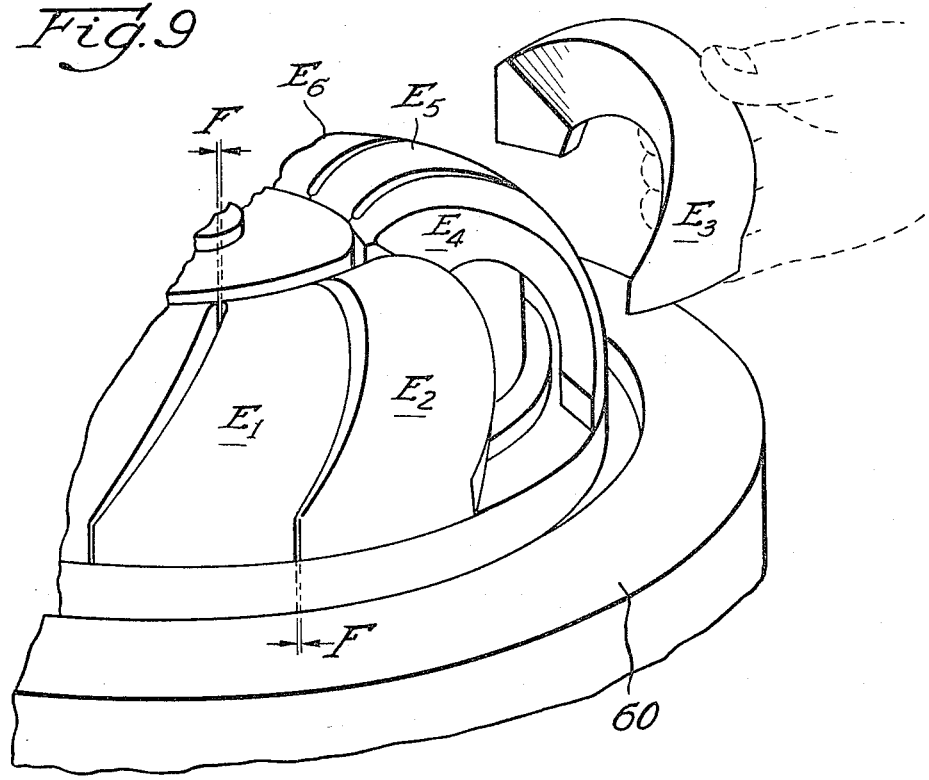
FIG. 9 is a perspective view of a typical pattern assembly used in casting the torque converter elements now known in the art.
Figure 9B:
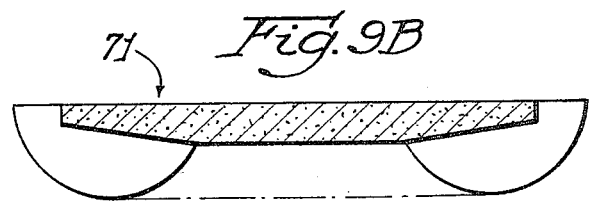
FIGS. 9a to 9e illustrate steps in the forming of pattern pieces for casting a typical element of the coreless converter of this invention and casting steps utilizing the patterns.

To more clearly characterize the complex and expensive procedures of the prior art, FIG. 9 illustrates a fragmentary portion of the pattern assembly for constructing one of the elements of the converter. Upon a drag 60 and a major clamping element for a plaster cast technique is positioned a plurality of core pattern pieces, designated E1, E2, E3, etc.; they are placed in circumferential arrangement to form as many blades as are necessary. There are as many as 28 to 64 blades in a typical impeller and the core pattern pieces become extremely numerous. On top of the cores E and drag 60 is placed a cope (not shown) which completes the casting assembly. It is important to indicate that each of the core pattern pieces E has required a previous complex fabrication process wherein *several* core boxes (not shown) are employed to form each one of the core pattern pieces. In fabricating the cores E, each operation necessitates a separate handling, separate drying, separate baking and eventual separate placement of the core boxes and then the resulting cores on the drag member 60.

Further production time and expense is devoted to spacing each of the core pattern pieces with a spacing of .007–0.15 of an inch. The clearances F between the core pattern pieces must be carefully distributed equally among all of the cores so that the blades are properly cast. Nonetheless, even with this extra care, some blades can be off as much as .150 of an inch and become thicker than the adjoining blade and distort the engineering design work. Thus, with precision plaster casting techniques, a typical impeller may have as many as 43 pieces of plaster that must be stacked and arranged in a particular manner, and a particular housing in a particular cope and drag, checked 43 times, demounted 43 times, rehandled again through the drawing over 43 times, and so on through the various steps to achieve the cast impeller.

By the construction of a coreless converter and in utilizing a die cast process having two-dimensional or single rake draft blades, the pattern pieces are reduced to *three*; increased dimensional control as well as hydraulic reproducability are achieved. For the purpose of this application, the use of the term "single rake draft" is used in the same sense as "two-dimentional," and illustrates a view of the blades of a typical element, such as in FIG. 4. The full contour and silhouette of the sides of the blades will always be exposed, that is, there will be no undercut or undercurved portions which will be hidden from view when looking in that direction. Thus, with the use of simple die cast patterns they can be brought together and withdrawn without the need for a complex number of pieces to accommodate compound curvatures. The plaster cores are no longer required and the separate handling of these core pieces is completely eliminated; the inadequate dimensional stability of previous methods is obviated and insurance of constant blade thickness is insured. Also, the elimination of spacing between separate pattern pieces reduces the amount of 'flash" which is experienced with prior art techniques and which would have required extra machining. The entire scope of two-dimensional coreless die casting techniques opens up other avenues not considered, resulting in reduced costs of torque converter construction; for example, plastic, zinc or aluminum may now be utilized.

Figure 9A:
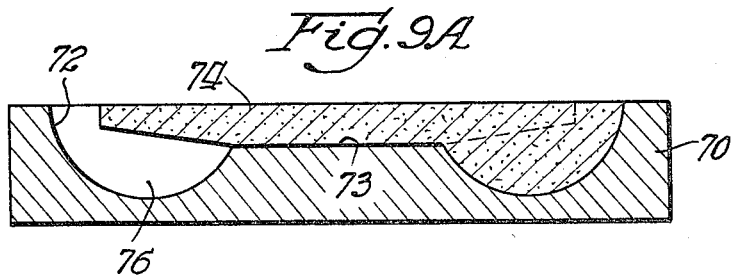
Figure 9C:
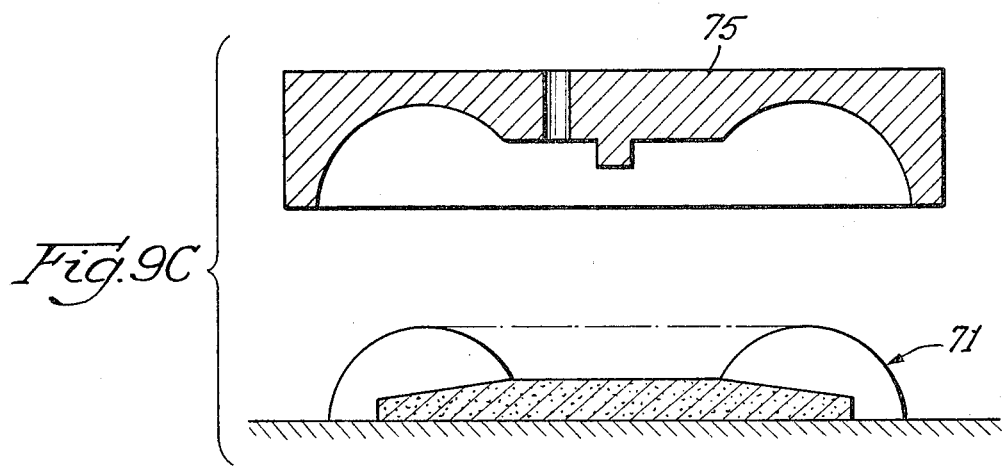
Figure 9D:
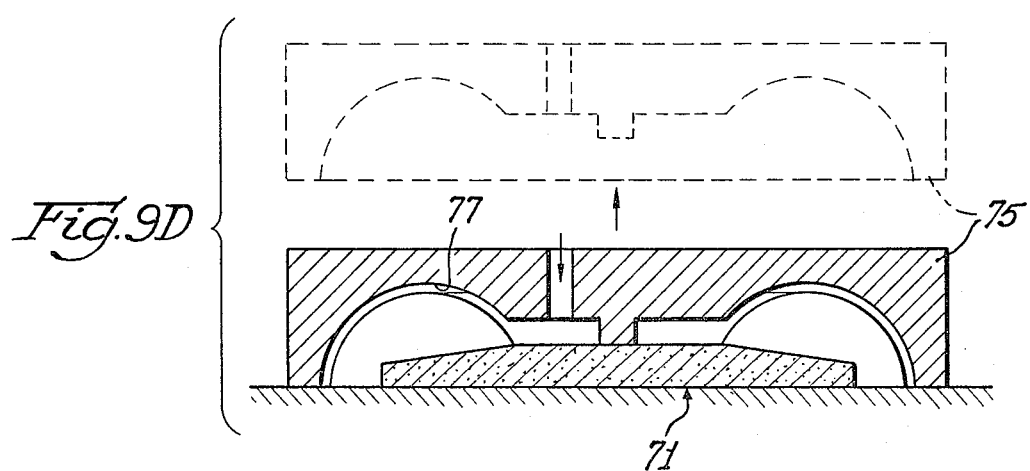
Figure 9E:
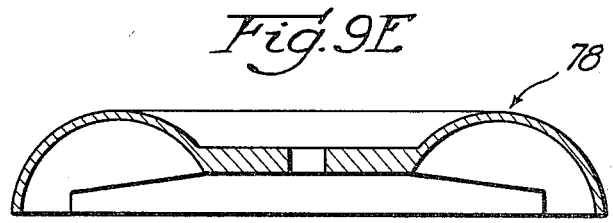

Referring now specifically to FIGS. 9a to 9e, there is represented the sequence of casting steps that are necessary to produce an element of a coreless converter by the two-dimensional die casting method herein. In FIG. 9a, the bottom part 70 of a mold is represented which is utilized in forming a drag 71 shown in FIG. 9b. The part 70 has a semi-toroidal cavity 72 with a recessed central portion 73 adapted to receive a die 74 which defines the blading and trailing edge of the blades. The cavity 72 has webs 76 spaced circumferentially thereabout to assume the configuration of the blades. A cope 75 is formed to cooperate with the drag 71 shown in FIG. 9b. The cope and drag are adapted to mate (FIG. 9c) when brought together with sufficient spacing 77 and clearance to define the shell and blades of a typical hydrodynamic element (see FIG. 9d). The cope and drag are brought together by movement in an axial direction relative to each other, much in the manner of a stamping operation. Upon removal of the cope and drag the cast element 78 appears as that shown in FIG. 9e and may be formed of aluminum.

While I have described by invention in connection with certain specific constructions and arrangements, it is to be understood that this is by way of illustration and not by way of limitation, that the scope of my invention is defined solely by the appended claims which should be construed as broadly as the prior art will permit.

I claim:

1. A hydraulic torque converter having a plurality of fluid circulating elements together defining a substantially toroidal fluid circuit having a geometric torus centerline and having an entrapped fluid vortex with a hydraulic circulation eye, said elements being rotatable about a common axis, said elements comprising at least one impeller for circulating and imparting kinetic energy to fluid therein, at least one turbine for absorbing kinetic energy from the fluid and at least one stator effective to change the directional flow of the fluid, each of said elements being particularly characterized by the inclusion of fluid guidance means providing freedom for said vortex eye to adjust to all of the various flow conditions of the converter said fluid guidance means comprising an annular shell having a plurality of blades extending generally radially inwardly thereof with respect to said torus center line, the radially inner terminal end portions of each of said blades being independent of adjacent terminal end portions for providing complete fluid intercommunication therepast, at least one of said elements having the respective blades thereof extending through and past said vortex eye under substantially all conditions of operation.

2. A hydraulic torque converter as in claim 1, in which said impeller and turbine each have blades which are continuously tapered in a radial direction taken with respect to said torus centerline.

3. A hydraulic torque as in claim 1, in which said guide vanes have entrance and exit angles lying within the blades have entrance and exit angles lying within the range of limits prescribed by the following chart, whereby satisfactory operation of the converter is obtained:

| Element | Inlet Angle, degrees | Outlet Angle, degrees |
|---|---|---|
| Impeller | 18-160 | 18-160 |
| Turbine | 15-140 | 70-168 |
| Stator | 18-160 | 10-115 |

4. A hydraulic torque converter as in claim 1, in which at least two of the elements have the blades thereof defined with leading and trailing edges disposed essentially in the radial flow component of the circulating fluid body taken with respect to said axis of rotation.

References Cited by the Examiner

UNITED STATES PATENTS

| | | | |
|---|---|---|---|
| 1,868,146 | 7/1932 | Kiep | 60—54 |
| 2,100,191 | 11/1937 | Lapsley | 60—54 |
| 2,139,107 | 12/1938 | Alison | 60—54 |
| 2,404,657 | 7/1946 | Roberts et al. | |
| 2,405,135 | 8/1946 | Butzbach | 60—54 |
| 2,410,185 | 10/1946 | Schneider et al. | 60—54 |
| 2,952,976 | 9/1960 | Alexandrescu | 60—54 |

FOREIGN PATENTS 846,455   8/1960   Great Britain.

JULIUS E. WEST, *Primary Examiner.*

UNITED STATES PATENT OFFICE
CERTIFICATE OF CORRECTION

Patent No. 3,287,908            November 29, 1966

Anthony C. Mamo

It is hereby certified that error appears in the above numbered patent requiring correction and that the said Letters Patent should read as corrected below.

Column 10, line 73, after "torque" insert -- converter --; line 74, strike out "guide vanes have entrance and exit angles lying within the".

Signed and sealed this 12th day of September 1967.

(SEAL)
Attest:

ERNEST W. SWIDER            EDWARD J. BRENNER
Attesting Officer            Commissioner of Patents